United States Patent
Tada et al.

[19]

[11] Patent Number: 5,803,854

[45] Date of Patent: Sep. 8, 1998

[54] SILENT CHAIN HAVING A SHEARED LINK BEARING SURFACE

[75] Inventors: Naosumi Tada, Nabari; Kensuke Nakamura, Wako; Kazushige Yakubo; Yoshiyuki Ohtaka, both of Wako, all of Japan

[73] Assignees: Borg-Warner Automotive, K.K.; Honda Giken Kogyo Kabushiki Kaisha, both of Japan

[21] Appl. No.: 813,240

[22] Filed: Mar. 7, 1997

[30] Foreign Application Priority Data

Mar. 18, 1996 [JP] Japan .................................. 8-090100

[51] Int. Cl.[6] ................................................. F16G 13/02
[52] U.S. Cl. ........................................ 474/213; 474/206
[58] Field of Search .................................. 474/206, 212, 474/213

[56] References Cited

U.S. PATENT DOCUMENTS

| 1,551,764 | 9/1925 | Muller | 474/212 X |
|---|---|---|---|
| 1,580,910 | 4/1926 | Layman et al. | 474/213 |
| 3,535,871 | 10/1970 | Jeffrey | 474/213 X |
| 3,636,788 | 1/1972 | Jeffrey | 474/213 |
| 4,906,224 | 3/1990 | Reber | 474/213 |
| 4,998,908 | 3/1991 | Cuypers | 474/245 |

FOREIGN PATENT DOCUMENTS 2-292548  12/1990  Japan .

*Primary Examiner*—Thomas R. Hannon
*Attorney, Agent, or Firm*—Sidley & Austin; Greg Dziegielewski

[57] ABSTRACT

A silent chain having multiple links each having a pair of teeth and apertures, which are connected by connecting pins inserted into the apertures. The links have an sheared link bearing surface which further reduces the wear of the sprocket tooth surface and further prevents defective bending of the silent chain. The bearing surface of the link tooth has a shear surface which may be formed by shaving or fine-blanking. The shear surface length may be at least approximately 70% or at least approximately 90% of the link thickness.

5 Claims, 2 Drawing Sheets

SILENT CHAIN HAVING A SHEARED LINK BEARING SURFACE

BACKGROUND OF THE INVENTION

This invention relates to a silent chain for transmitting power in an automobile, motorcycle or other vehicle. More specifically, this invention relates to a power transmission chain having an improved or sheared link tooth bearing surface.

Silent chains used for transmitting power in an automobile, motorcycle or other vehicle are typically comprised of multiple links, each having a pair of teeth and apertures, which are connected by connecting pins inserted in the apertures.

As illustrated in FIG. 6, conventional links are typically manufactured by press blanking the link material so that the shear surface length 20 of the bearing surface of the link tooth is approximately 20% of the link thickness 10. Thus, in the conventional silent chain, there is a high contact pressure on the sprocket surface where the link tooth bearing surface engages the sprocket surface. After long-term operation of the conventional silent chain, wear can occur on the surface of the sprocket tooth from this contact pressure. Moreover, conventional silent chain links have a tendency to develop a fractured surface 18 in the link tooth bearing surface. In extreme cases, burrs 19 on the link tooth bearing surface can cause defective operation of the silent chain.

The present invention is directed to the above-described problems in conventional silent chains, and offers a silent chain having an improved link tooth bearing surface which further reduces the wear of the sprocket tooth surface and further prevents defective operation of the silent chain.

SUMMARY OF THE INVENTION

The present invention concerns a silent chain having a link tooth bearing surface of increased durability. In one embodiment of the silent chain of the present invention, multiple links, each having a pair of teeth and apertures, are connected by connecting pins inserted in the apertures. The bearing surface of the link tooth has a shear surface length that is approximately 70% or more of the link thickness. In these embodiments, the link tooth bearing surface may be formed by shaving or fine-blanking.

In another embodiment, the bearing surface of the link tooth has a shear surface length that is approximately 90% or more of the link thickness. In this embodiment, the link tooth bearing surface may be formed by fine-blanking.

For a better understanding of these and other embodiments of the invention, reference should be made to the following detailed description taken in conjunction with the accompanying drawings.

DETAILED DESCRIPTION OF THE PREFERRED EMBODIMENTS

Turning now to the drawings, the present invention is directed to providing a silent chain having a link tooth bearing surface comprising a shear surface, where the shear surface length is approximately 70% or more of the link thickness. This increases the amount of contact between the link tooth and sprocket tooth, thereby reducing both the wear and contact pressure on the sprocket tooth.

The present invention is further directed to providing a silent chain having a link tooth bearing surface comprising a shear surface, where the shear surface length is approximately 90% or more of the link thickness. This further increases the contact area between the link tooth and the sprocket tooth, so that the wear and contact pressure on the sprocket tooth can be further reduced.

The present invention is also directed to providing a link bearing surface having an increased shear surface length, where the shear surface is formed by shaving or fine-blanking. This further reduces the occurrence of fractured surfaces on the bearing surface, reduces both the wear and contact pressure on the sprocket tooth, minimizes "burrs" on the bearing surface, and prevents the occurrence of defective bending of the chain.

The prior art teaches the use of a fine blanking process to provide a smooth aperture opening for insertion of the pins. For example, U.S. Pat. No. 4,906,224 and counterpart Japanese laid-open publication No. 2-292548 teach such an operation.

FIGS. 1–5 depict various embodiments of this silent chain invention having an improved link tooth bearing surface.

Figure 1:
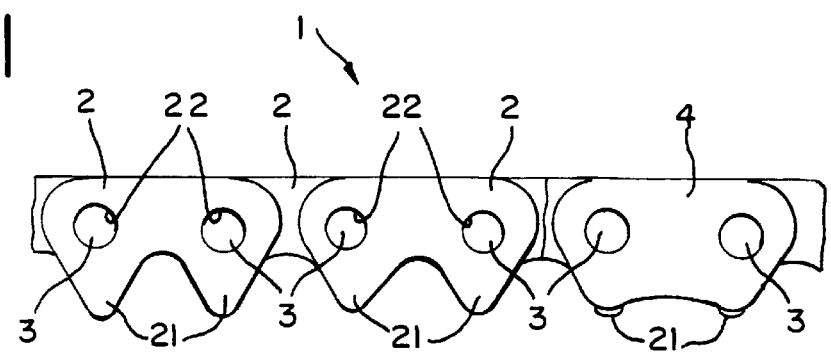
FIG. 1 is a front elevational view of a portion of a silent chain incorporating one embodiment of the present invention.
Figure 2:
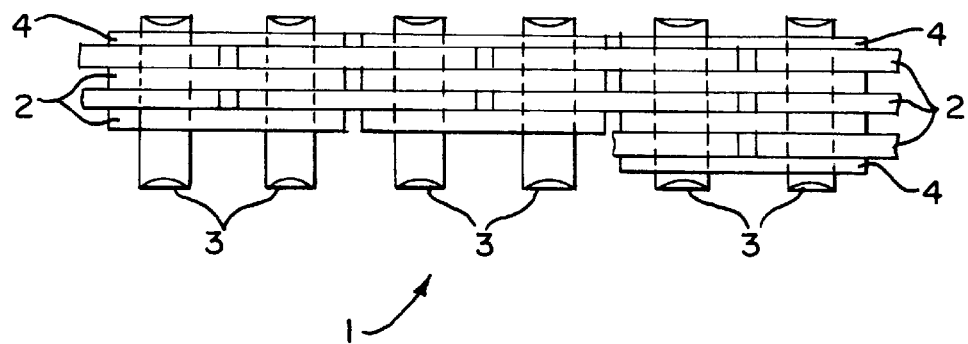
FIG. 2 is a top plan view of the silent chain of FIG. 1.

The silent chain 1 of FIGS. 1 and 2 includes links 2 each having a pair of teeth 21 and a pair of apertures 22. Round pins 3, for example, are inserted in apertures 22 of links 2 for pivotable connection of the link 2 and the guide link 4 positioned on the outermost sides of the links 2. The guide links are typically press fit on the outside of the pins and act to maintain the chain on the sprocket.

Figure 3:
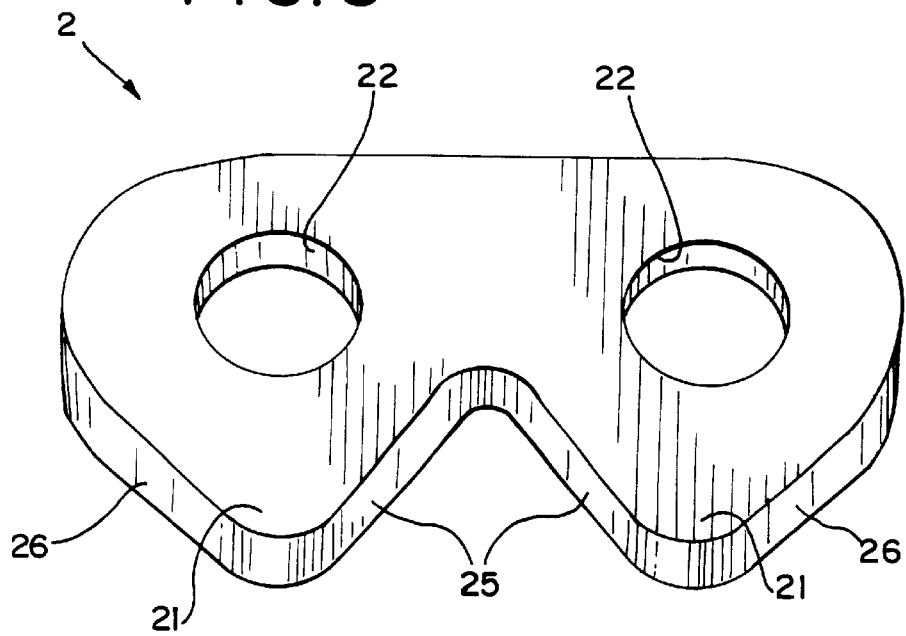
FIG. 3 is a perspective view illustrating the front and bottom of a link of the present invention.

As shown in FIG. 3, each tooth 21 of the link 2 includes an inner flank 25 and an outer flank 26. Inner flank 25 and outer flank 26 may be flat or convex surfaces. Also, both the inner and outer flanks 25 and 26 may be formed by shaving a portion of the flank.

Figure 4:
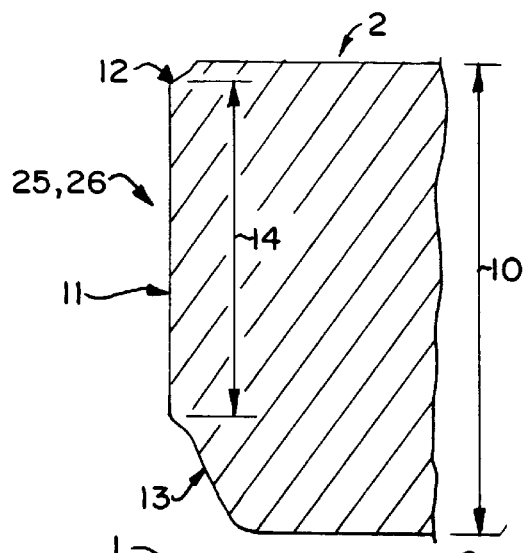
FIG. 4 is a side sectional view of the bearing surface of a link tooth of the present invention.

As shown in FIG. 4, the link flanks have a bearing surface which comprises a shear surface 11 of shear surface length 14. The shear surface length 14 may be approximately 70% of the thickness 10 of the link 2.

Figure 5:
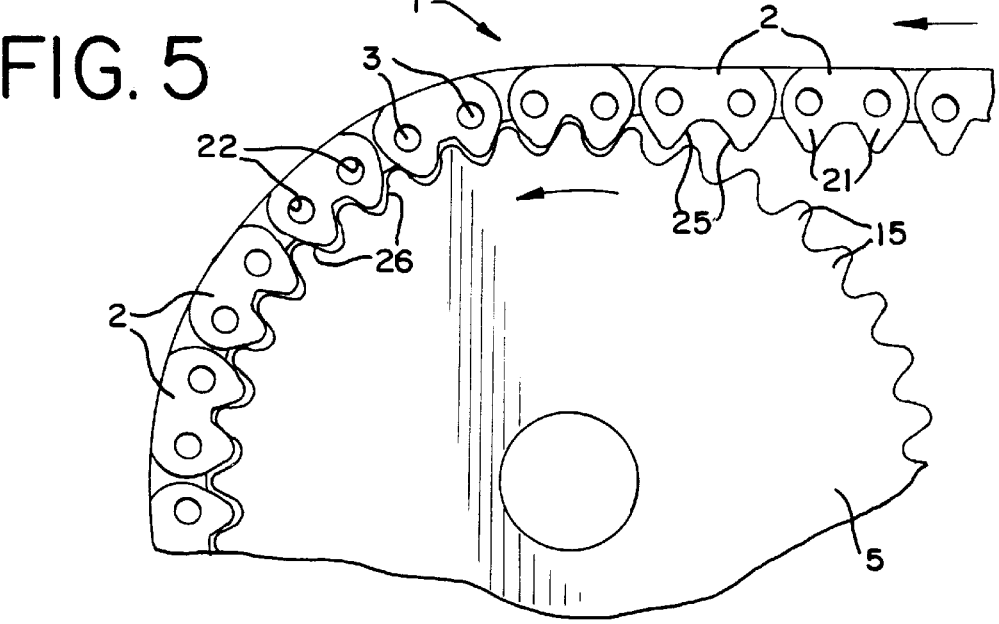
FIG. 5 is a front elevational view illustrating the engagement between a sprocket and a silent chain of the present invention.
Figure 6:
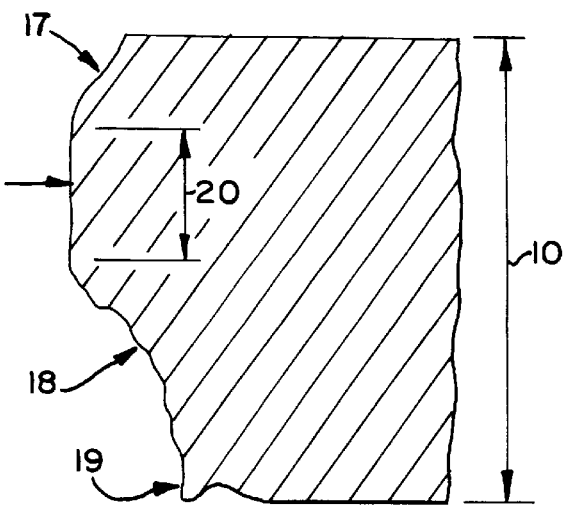
FIG. 6 is a side view of the bearing surface of a link tooth in a conventional silent chain.

FIG. 5 illustrates the engagement between a silent chain 1 and a sprocket 5 for one embodiment of the present invention. For clarity, guide links 4 have been omitted from FIG. 5. At the start of engagement of the chain of this embodiment of the invention, the sprocket tooth 15 first contacts an inner flank 25, and then contacts an outer flank 26. The contact area between link tooth 21 and the sprocket tooth is increased when the shear surface length 14 on each bearing surface of the inner flank 25 and outer flank 26 of link tooth 21 is approximately 70% of the link thickness 10. Thus, the contact pressure on the sprocket tooth and the wear on the sprocket tooth can both be further reduced.

In addition, in some embodiments, both flanks 25 and 26 may be formed by shaving so that "burrs" on the link tooth bearing surface can be minimized and defective bending of the silent chain 1 can be further prevented. Typically, when the shear surface length 14 is less than 70% of the link thickness 10, wear occurs on the sprocket tooth after prolonged engagement fatigue testing. In general, a shear surface length 14 which is 70% or more of link thickness 10 is necessary to reduce wear.

Fine-blanking can be used to form the link tooth, and can be used to make the shear surface length 14 approximately 70% or more of the link thickness 10. Since the thickness of the link is typically 1–2 mm, fine-blanking can also be used to form a shear surface length that is approximately 90% or more of the link thickness. When shear surface length 14 is approximately 90% of link thickness 10, the contact area between the link tooth and the sprocket tooth is further increased. Also, when shear surface length 14 is approximately 90% of link thickness 10, the contact pressure on the sprocket tooth is reduced by approximately 12% with respect to the contact pressure when shear surface length 14 is approximately 70% of link thickness 10. Thus, the wear on the sprocket tooth can be further reduced.

Although both inner flank 25 and outer flank 26 are formed by shaving or fine-blanking in some of the embodiments of the present invention, this invention is not limited to link teeth having both flanks formed in the same manner. For example, in an "inside engagement" chain, in which only the sprocket tooth and inner flank provide power transmission with each other, and in an "outside engagement" chain, in which only the sprocket tooth and outer flank provide power transmission with each other, only the inner flank or outer flank, respectively, need be formed by shaving.

Also, although round pins 3 are used as connecting pins in some of the above embodiments, the invention may, for example, also be applied to a rocker joint-type silent chain.

Thus, the present invention provides for further increased contact area between link tooth and the sprocket tooth, reduced contact pressure and wear on the sprocket tooth, minimization of "burrs" on the bearing surface, and prevention of defective operation of the silent chain.

What is claimed is:

1. A silent chain comprising:

a plurality of rows of interleaved links, each of said links having a pair of teeth and a pair of apertures and a thickness, each of said teeth being defined by an outside flank and an inside flank;

a plurality of pivot pins being inserted into said apertures to interconnect said links and to permit the articulation of said rows of interleaved links;

said inside and outside flanks of said link teeth each having at least one bearing surface that includes a shear surface along a portion of the thickness of the flank; and said shear surface being at least approximately 70% of the thickness of the link.

2. The silent chain of claim 1, wherein said shear surface is formed by shaving.

3. The silent chain of claim 1, wherein said shear surface is formed by fine-blanking.

4. A silent chain comprising:

a plurality of rows of interleaved links, each of said links having a pair of teeth and a pair of apertures and a thickness, each of said teeth being defined by an outside flank and an inside flank;

a plurality of pivot pins being inserted into said apertures to interconnect said links and to permit the articulation of said rows of interleaved links;

said inside and outside flanks of said link teeth each having at least one bearing surface that includes a shear surface along a portion of the thickness of the flank; and said shear surface being at least approximately 70% of the thickness of the link.

5. The silent chain of claim 4, wherein said shear surface is formed by fine-blanking.

* * * * *

UNITED STATES PATENT AND TRADEMARK OFFICE
CERTIFICATE OF CORRECTION

PATENT NO. : 5,803,854
DATED : September 8, 1998
INVENTOR(S) : Tada, et al.

It is certified that error appears in the above-identified patent and that said Letters Patent is hereby corrected as shown below:

In Claim 4, line 32, of the Patent, change "70%" to --90%--.

Signed and Sealed this

First Day of February, 2000

Attest:

Q. TODD DICKINSON

*Attesting Officer*    *Acting Commissioner of Patents and Trademarks*